US011402635B1

(12) United States Patent
Zannoli et al.

(10) Patent No.: US 11,402,635 B1
(45) Date of Patent: Aug. 2, 2022

(54) SYSTEMS AND METHODS FOR MEASURING VISUAL REFRACTIVE ERROR

(71) Applicant: Facebook Technologies, LLC, Menlo Park, CA (US)

(72) Inventors: Marina Zannoli, Seattle, WA (US); Kristen Bowles, Houston, TX (US); Ryan Michael Ebert, Kirkland, WA (US); Douglas Robert Lanman, Bellevue, WA (US); Kevin James MacKenzie, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/987,934

(22) Filed: May 24, 2018

(51) Int. Cl.
*G02B 27/01* (2006.01)
*H04N 1/60* (2006.01)

(52) U.S. Cl.
CPC ....... *G02B 27/0172* (2013.01); *H04N 1/6008* (2013.01); *G02B 2027/0116* (2013.01); *G02B 2027/0185* (2013.01)

(58) Field of Classification Search
CPC .......... G02B 27/0172; G02B 2027/014; G02B 2027/0185; G02B 27/0179; G02B 13/18; G02B 27/0025; G02B 2027/011; H04N 13/128; G06F 3/013; G06F 1/1637; G06F 3/012
See application file for complete search history.

(56) References Cited

U.S. PATENT DOCUMENTS

| | | | | |
|---|---|---|---|---|
| 3,540,795 A * | 11/1970 | Harris | ............... | G02B 27/0025 359/489.05 |
| 4,861,156 A * | 8/1989 | Terry | .................... | A61B 3/032 351/243 |
| 4,924,302 A * | 5/1990 | Shiota | ................... | H04N 1/393 358/507 |
| 5,539,422 A * | 7/1996 | Heacock | ........... | G02B 27/0172 351/158 |
| 7,466,495 B2 * | 12/2008 | Kuroda | ............... | G02B 15/173 359/683 |
| 7,697,212 B2 * | 4/2010 | Jethmalani | .............. | G02C 7/02 359/652 |
| 7,855,743 B2 * | 12/2010 | Sako | ................... | G02B 27/017 348/222.1 |

(Continued)

OTHER PUBLICATIONS

S. Ishihara, Tests for color-blindness (Handaya, Tokyo, Hongo Harukicho, 1917) (Year: 1917).*

*Primary Examiner* — Michael J Jansen, II
(74) *Attorney, Agent, or Firm* — FisherBroyles, LLP

(57) ABSTRACT

A method may include displaying, to a user, a first color in a first area and a second color in a second area, where (1) the second color has a longer wavelength than the first color and (2) the first and second color have an expected longitudinal chromatic aberration for a human eye. The method may also include receiving, from the user, an indication of whether the user perceives (1) the first area as being clearer than the second area or (2) the second area as being clearer than the first area. The method may further include determining, based on the indication of the user and the expected longitudinal chromatic aberration, information about a refractive error of the user's vision. Various other methods, systems, and devices are also disclosed.

20 Claims, 20 Drawing Sheets

(56) References Cited

U.S. PATENT DOCUMENTS

| | | | | |
|---|---|---|---|---|
| 7,876,374 B2* | 1/2011 | Sako | ...................... | A63F 13/12 348/333.01 |
| 8,009,219 B2* | 8/2011 | Sako | ...................... | A63F 13/12 348/333.01 |
| 8,368,794 B2* | 2/2013 | Sako | ................... | A61B 5/6814 348/333.01 |
| 8,405,637 B2* | 3/2013 | Bridger | ................ | G06F 3/0421 345/166 |
| 8,659,757 B2* | 2/2014 | Hyers | ................ | G01M 11/0264 356/421 |
| 9,905,168 B1* | 2/2018 | Richards | .............. | G09G 3/3225 |
| 10,025,060 B2* | 7/2018 | Lanman | ................... | G02B 7/08 |
| 10,075,685 B1* | 9/2018 | Fulghum | .............. | G06T 19/006 |
| 10,241,569 B2* | 3/2019 | Lanman | ............... | G06F 3/04842 |
| 10,345,590 B2* | 7/2019 | Samec | .................. | A61B 3/085 |
| 10,345,591 B2* | 7/2019 | Samec | .................. | A61B 3/085 |
| 10,345,592 B2* | 7/2019 | Samec | .................. | A61B 3/085 |
| 10,430,939 B1* | 10/2019 | Levin | ...................... | G06T 7/74 |
| 2004/0165090 A1* | 8/2004 | Ning | ................ | H04N 5/232123 348/E5.045 |
| 2004/0174610 A1* | 9/2004 | Aizenberg | ............... | G02B 3/14 359/665 |
| 2005/0046954 A1* | 3/2005 | Achtner | ............ | G02B 27/0025 359/630 |
| 2007/0279586 A1* | 12/2007 | Jethmalani | ............... | G02C 7/02 351/159.41 |
| 2008/0062297 A1* | 3/2008 | Sako | .................... | G02B 27/017 348/333.02 |
| 2008/0225405 A1* | 9/2008 | Kuroda | .................. | H04N 5/217 359/687 |
| 2008/0239088 A1* | 10/2008 | Yamashita | ........... | H04N 5/2356 348/222.1 |
| 2008/0259199 A1* | 10/2008 | Sako | ...................... | A63F 13/12 348/333.01 |
| 2010/0013739 A1* | 1/2010 | Sako | ................... | A61B 5/6814 345/8 |
| 2010/0220037 A1* | 9/2010 | Sako | ...................... | A63F 13/12 345/8 |
| 2010/0321409 A1* | 12/2010 | Komori | ................ | G02B 27/017 345/656 |
| 2011/0007277 A1* | 1/2011 | Solomon | .............. | H04N 13/344 353/30 |
| 2011/0286634 A1* | 11/2011 | Imamura | ........... | H04N 5/23232 382/106 |
| 2012/0281081 A1* | 11/2012 | Atif | .................... | H04N 5/35721 348/E5.09 |
| 2013/0250235 A1* | 9/2013 | Foulds | ..................... | G02C 7/04 351/159.65 |
| 2016/0270656 A1* | 9/2016 | Samec | .................. | A61B 3/085 |
| 2017/0000326 A1* | 1/2017 | Samec | .................. | A61B 3/1015 |
| 2017/0000335 A1* | 1/2017 | Samec | .................. | A61B 3/085 |
| 2017/0186231 A1* | 6/2017 | Petrov | .................. | G06F 3/0304 |
| 2018/0218656 A1* | 8/2018 | Richards | .................. | G06T 5/10 |
| 2019/0067254 A1* | 2/2019 | Fu | ...................... | G02B 27/0025 |
| 2019/0132528 A1* | 5/2019 | Nashizawa | ............. | H04N 5/232 |
| 2021/0205986 A1* | 7/2021 | Kalouche | .............. | B25J 9/1689 |

\* cited by examiner

Display Area
200

SYSTEMS AND METHODS FOR MEASURING VISUAL REFRACTIVE ERROR

BACKGROUND

Some head-worn displays, including virtual reality (VR) and augmented reality (AR) headsets, may fit over corrective lenses of a user. However, wearing corrective lenses can detract from the user experience and can decrease the effectiveness of eye tracking systems (which may have difficulty tracking eye movement through eyeglasses). It may therefore be preferable for a head-worn display (HMD) to have a display system that can be modified to account for user refractive error (amount of visual correction required), so that a user who requires refractive error correction doesn't need to wear corrective lenses when using the HMD.

Some existing HMDs may allow users to manually correct for their refractive error by self-adjusting a knob that changes the focal distance of the HMD display. However, experimental data shows that some users (e.g., myopes) tend to adjust the HMD closer to the eye than optimal, creating an environment that causes increased accommodation of the eye. This may result in user fatigue, headaches, and/or increased refractive error over time. What is needed, therefore, are improved systems and methods for providing refractive correction for users of head-worn display systems.

SUMMARY

As will be described in greater detail below, the instant disclosure describes embodiments, including head-worn display system methods and devices, that may estimate a user's refractive error and may correct for such error, thereby improving retinal image quality without corrective lenses and without requiring manual adjustment by a user.

One embodiment is a computer-implemented method that may include displaying, to a user, an image having a first area that may include a first color and a second area that may include a second color, the second color having a longer wavelength than the first color. The first and second colors may be selected based on an expected chromatic aberration for a human eye. The method also may include receiving, from the user, an indication of whether the user perceives the first area as being clearer than the second area or the second area as being clearer than the first area and may also include determining, based on the indication of the user and the expected chromatic aberration, information about a refractive error of the user's vision. In an example, the image may have a third area including a third color, a wavelength of the third color may be between a wavelength of the first color and a wavelength of the second color, and the indication from the user may be based on the user's perception of the first and second areas while the user's vision is focused on the third area. In one example, the first color may include a blue color, the second color may include a red color, and the third color may include a green color.

In at least one embodiment, determining the information about the refractive error of the user's vision may further include determining how to change a dioptric distance of the image to evaluate the refractive error of the user's vision. In an example, the dioptric distance of the image may be changed by increasing the dioptric distance of the image if the user indicates that the first area is clearer than the second area and/or by decreasing the dioptric distance of the image if the user indicates that the second area is clearer than the first area. In one example, changing the dioptric distance may include changing a distance between the image and a lens through which the user views the image by moving at least one of the lens and/or a display on which the image is shown. In one example, changing the dioptric distance may include changing an optical power of a lens through which the user views the image. In at least one example, the receiving, determining, and changing steps may be repeated as necessary or desired to obtain an estimate of the refractive error of the user's vision, and may be performed for each eye of a user.

In one or more embodiments, the indication from the user may indicate that the user perceives the first and second areas as having similar clarity, and determining the information about the refractive error of the user's vision may include determining that a dioptric distance of the image comprises an estimate of the refractive error of the user's vision. The image may be shown to the user via a near-eye display that may include a display of a head-worn artificial reality system.

At least one embodiment is a system that may include a near-eye display configured to display, to a user, an image having a first area that may include a first color and a second area that may include a second color, the second color having a longer wavelength than the first color. The first and second colors may be selected based on an expected longitudinal chromatic aberration for a human eye. An input device of the system may be configured to receive an indication of whether the user perceives the first area as being clearer than the second area or the second area as being clearer than the first area. A processor in the system may be programmed to determine, based on the indication of the user and the expected longitudinal chromatic aberration, information about a refractive error of the user's vision. In one example, the image may also have a third area that may include a third color, a wavelength of the third color may be between a wavelength of the first color and a wavelength of the second color, and the indication from the user may be based on the user's perception of the first and second areas while the user's vision is focused on the third area. The first color may include a blue color, the second color may include a red color, and the third color may include a green color.

In an embodiment, the processor may determine information about the refractive error of the user's vision by determining how to change a dioptric distance of the image to evaluate the refractive error of the user's vision. In an example, the processor may direct an actuator to change the dioptric distance of the image by increasing the dioptric distance of the image if the user indicates that the first area is clearer than the second area and/or by decreasing the dioptric distance of the image if the user indicates that the second area is clearer than the first area. In one example, the actuator may change the dioptric distance by moving a lens through which the user views the image and/or by moving a display on which the image is shown. In an example, the actuator may change the dioptric distance by changing an optical power of an accommodative lens.

One embodiment may include a non-transitory computer-readable medium comprising one or more computer-executable instructions that, when executed by at least one processor of a computing system, may cause the computing system to display to a user an image having a first area that may include a first color and a second area that may include a second color, and the second color may have a longer wavelength than the first color. The first and second colors may be selected based on an expected longitudinal chromatic aberration for a human eye. The computer-executable instructions may also cause the computing system to receive, from the user, an indication of whether the user perceives the first area as being clearer than the second area or the second area as being clearer than the first area, and to determine, based on the indication of the user and the expected longitudinal chromatic aberration, information about a refractive error of the user's vision.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
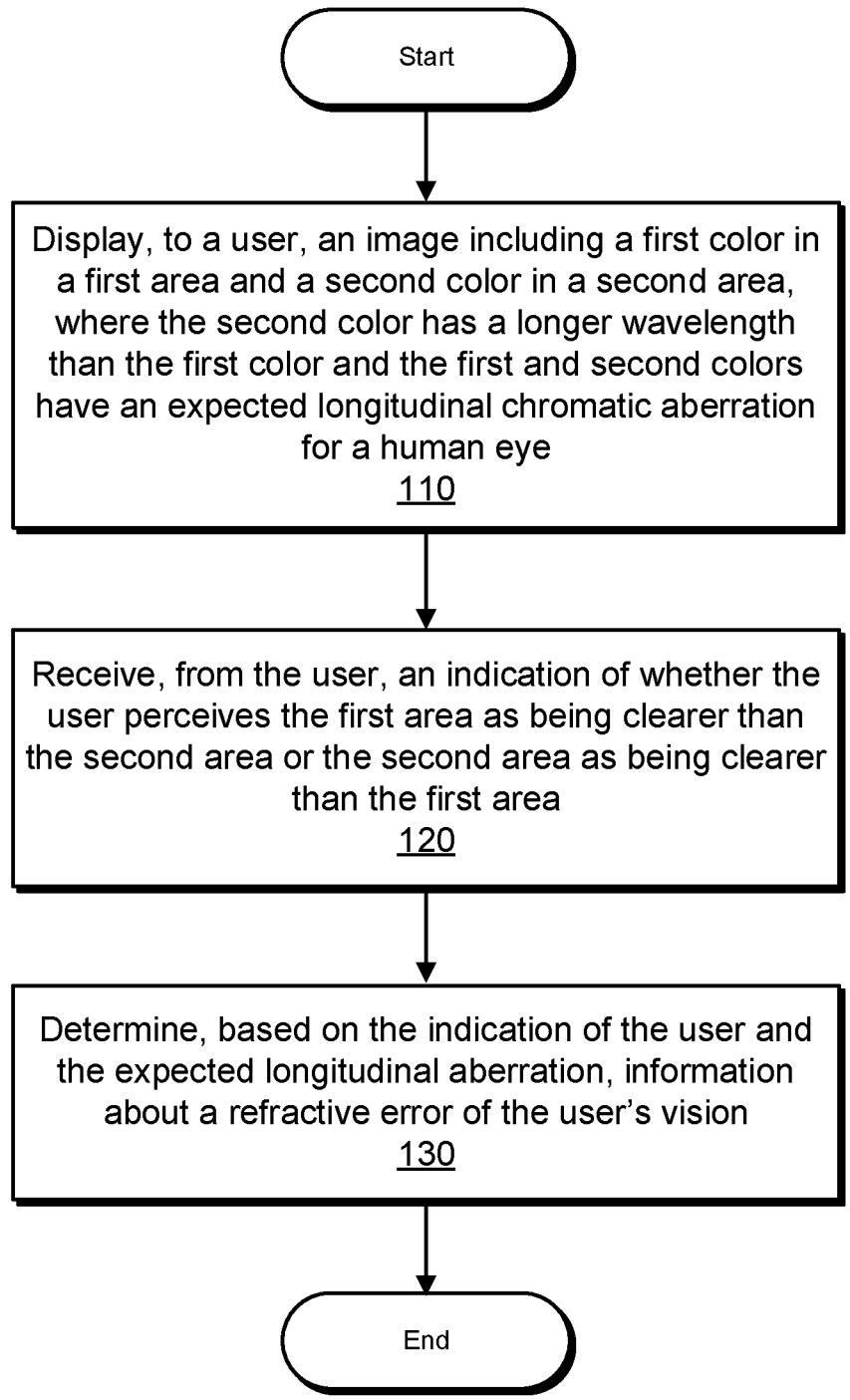
FIGS. 1A and 1B are flow diagrams of exemplary methods for measuring a user's refractive error.

The embodiments described herein are examples intended to illustrate how various system and method embodiments may be structured and function. None of the specific details described herein are intended to limit the scope of the claimed invention.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

This disclosure is generally directed to systems and methods for ascertaining visual refractive errors. For example, a display system may display two or more different colors (e.g., red and blue) to a user. Because the different colors have different wavelengths and because the human eye has longitudinal chromatic aberration, the different colors passing through the lens of the human eye converge at different focal distances, potentially causing an image of one color to appear blurry to the user even when a similarly situated image of a different color appears clear to the user. Accordingly, the systems and methods described herein may receive feedback from the user indicating that one color appears clearer or blurrier to the user than the other color and may, in response, ascertain a visual refractive error experienced by the user and/or may compensate for a visual refractive error experienced by the user.

Embodiments of this disclosure may address some limitations of visual perception. For example, since the perception of image sharpness may be relatively subjective, judging absolute quantities of sharpening or blurring may be difficult for an individual. Further, blur as a cue may be unsigned in the sense that a stand-alone measure of perceived blur does not differentiate between near defocus (closer than the near point) and far defocus (farther than the far point). To address these constraints, the systems and methods discussed herein may use stimuli for which the pattern of blur is both (1) different as a function of wavelength, therefore allowing for a discrimination rather than a detection measure and (2) different for near and far defocus (that is, the blur is not the same for near defocus as for far defocus).

Ascertaining visual refractive errors through user feedback to longitudinal chromatic aberration (and, e.g., compensating for the ascertained visual refractive errors) may provide one or more advantages over systems for manually correcting for visual refractive errors. For example, manual adjustments performed by users may lack precision and/or may suffer from an over-correction bias. Accordingly, systems and methods described herein may identify and/or correct visual refractive errors with greater precision and/or accuracy. In addition, in some examples, by enabling a user to quickly compare the relative clarity and blurriness of images of differing colors, these systems and methods may reduce the time and/or user effort taken to identify and/or correct for visual refractive errors.

Embodiments presented herein may also provide one or more features and advantages for head-mounted display systems. For example, users of head-mounted display systems (e.g., for augmented or virtual reality) without appropriate vision correction may suffer from fatigue, discomfort, and/or a less immersive experience. Thus, head-mounted display systems with adjustable-focus lenses may ascertain and correct for visual refractive errors to reduce user fatigue and discomfort and/or to improve user immersion. In addition, in some examples a head-mounted display system may iteratively collect feedback from a user about perceived longitudinal chromatic aberration at differing levels of optical power by making iterative adjustments to adjustable-focus lenses or other varifocal components, thereby potentially improving the accuracy and/or precision of visual refractive error judgments and/or corrections.

Figure 1B:
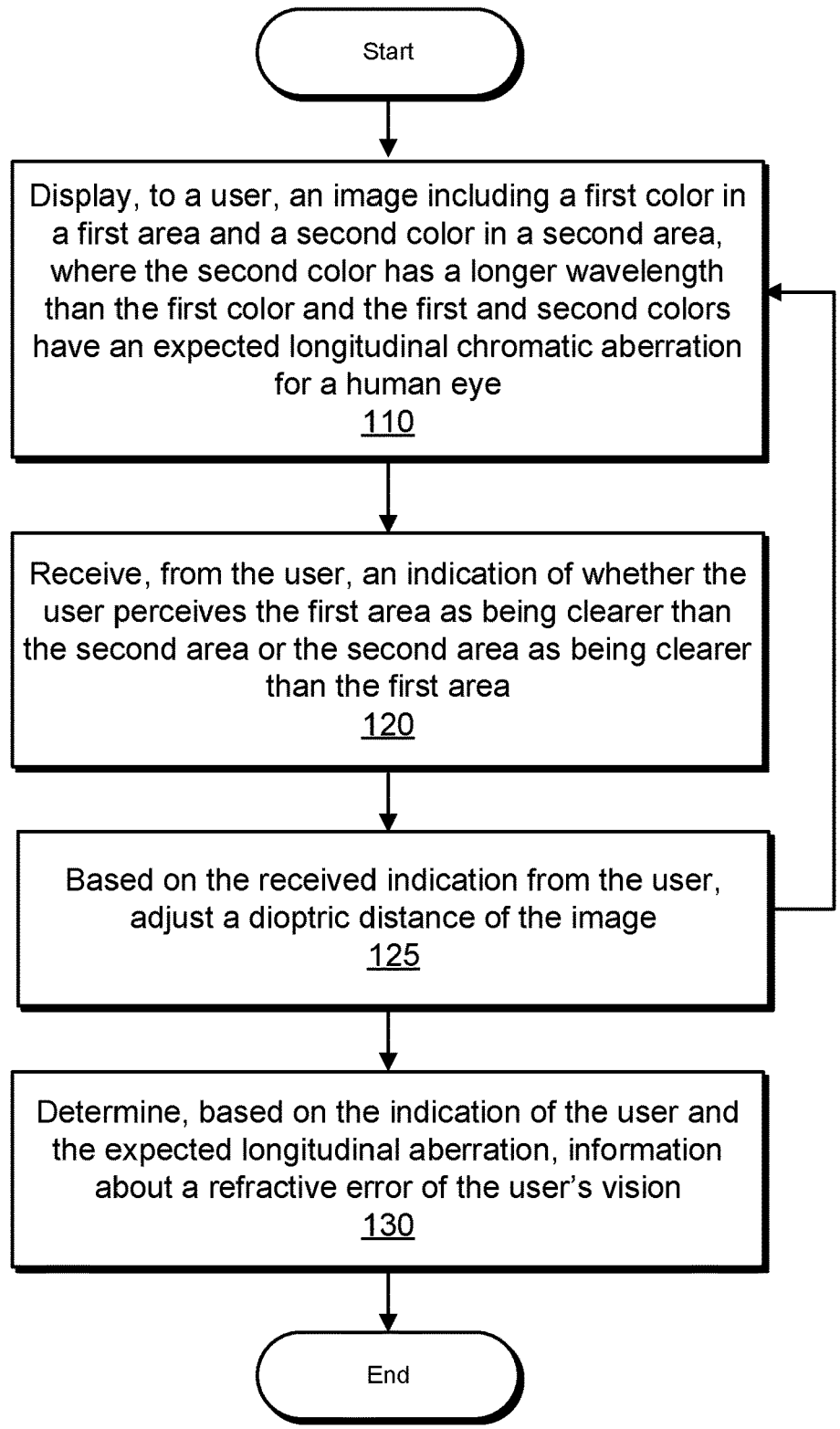
Figure 2:
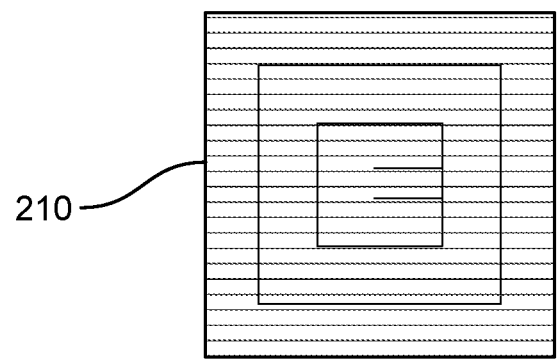
FIG. 2 is a block diagram of an exemplary display area with two different colors.
Figure 2:
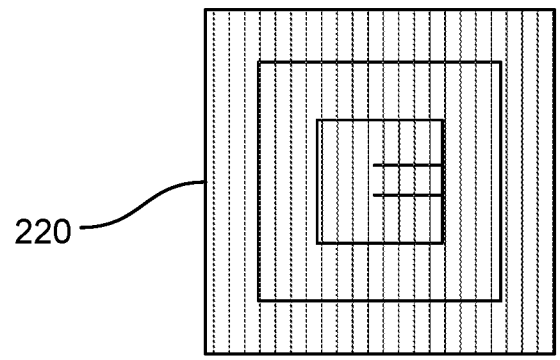
Figure 3:
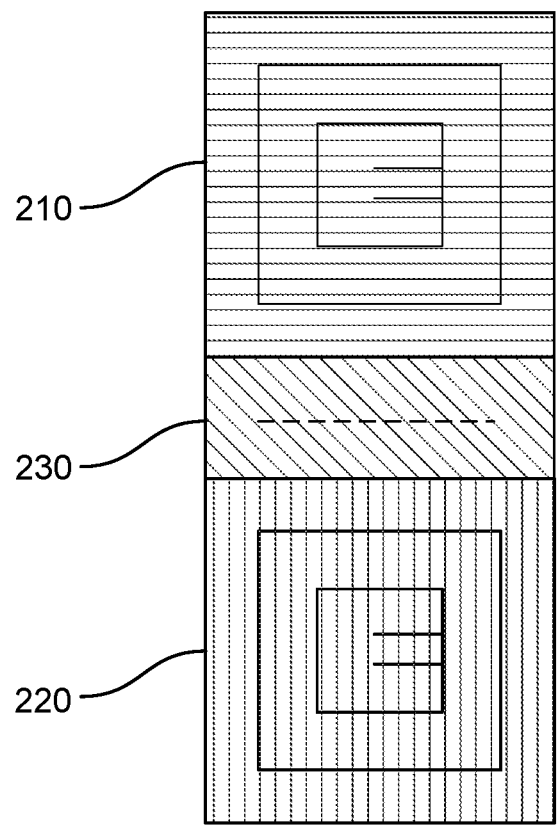
FIG. 3 is a block diagram of an exemplary display area with three different colors.
Figure 17:
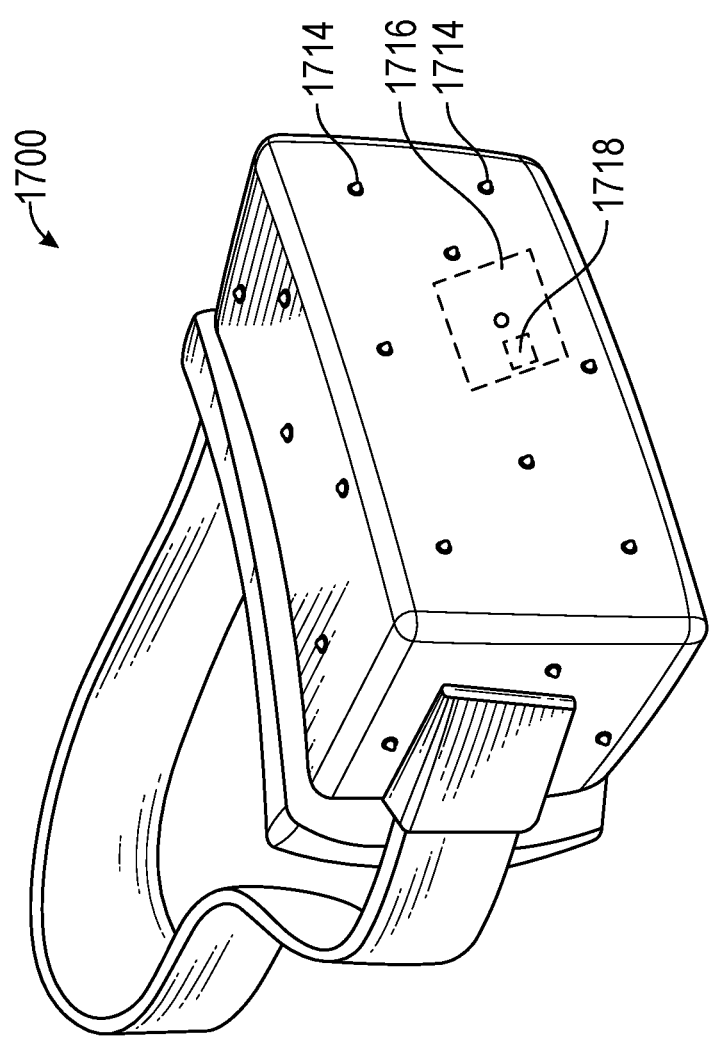
FIG. 17 shows an exemplary head-worn display capable of implement one or more embodiments of the present disclosure.
Figure 18:
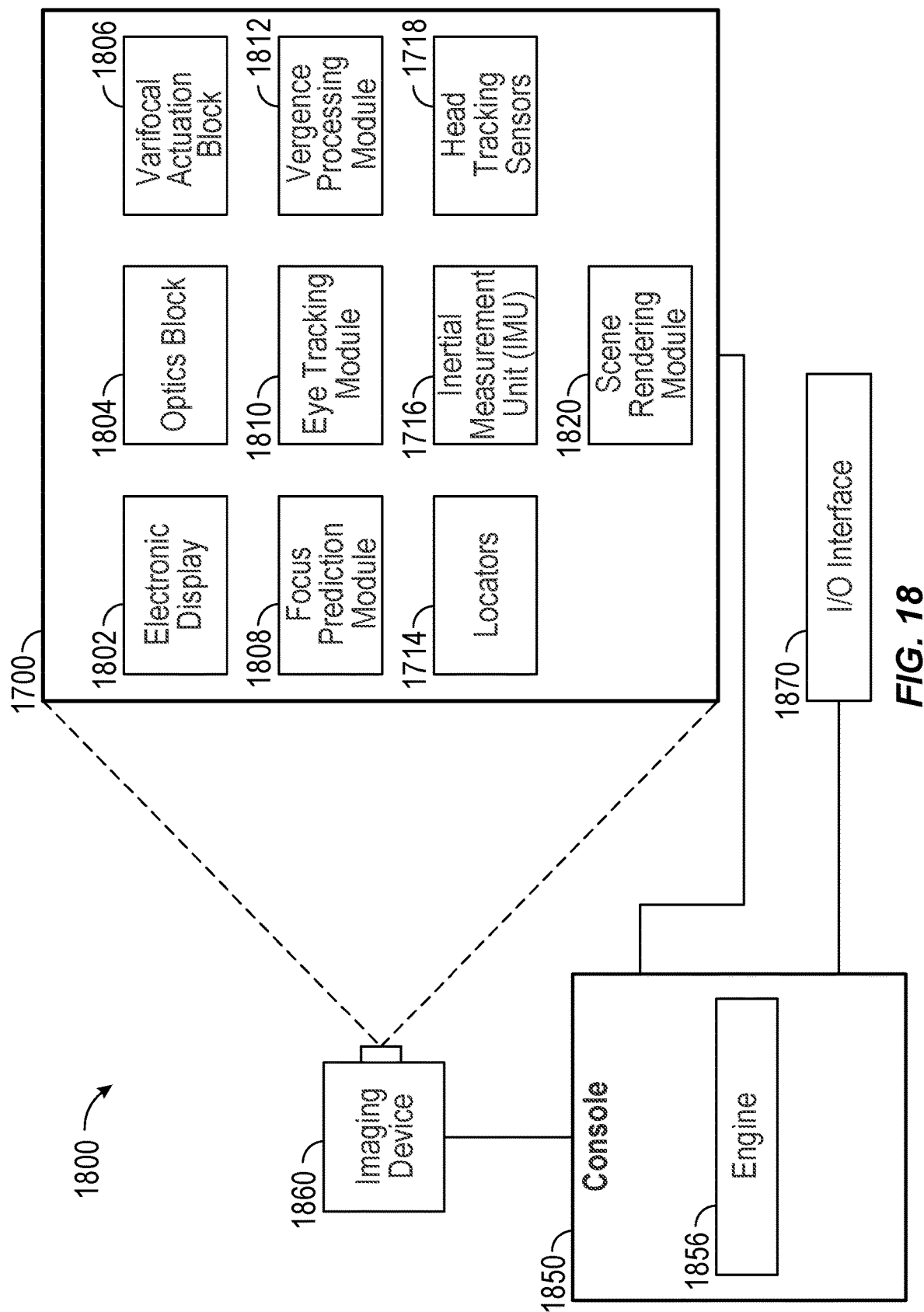
FIG. 18 is a block diagram of a varifocal system according to certain embodiments.

The following will provide, with reference to FIGS. 1A and 1B, a discussion of steps of exemplary methods for identifying a user's refractive error. The discussion corresponding to FIGS. 2 and 3 is directed to detecting a user's refractive error based on which colors of light are clear or blurry, and the discussion corresponding to FIGS. 4 and 5 explain longitudinal chromatic aberrations of the human eye. The following will also provide, with reference to FIGS. 6-8, examples of which patterns a user is expected to see as sharp or blurry when a focal distance of the patterns is beyond a far point of a user's accommodation range, when a focal distance of the patterns is within a user's accommodation range, and when a focal distance of the patterns is closer than a near point of a user's accommodation range. The discussion corresponding to FIGS. 9-11 explains zones of clear focus for myopes, hyperopes, and emmetropes, and the discussion of FIGS. 12-15 provides an overview of various methods and exemplary trials based on the disclosed embodiments. The discussion of FIG. 16 explains how a user may interact with an embodiment, and the discussion of FIGS. 17 and 18 provide examples of head-mounted displays in which embodiments of the present disclosure may be implemented. The discussion FIG. 19 describes steps of an exemplary method for measuring a user's refractive error.

FIG. 1A is a flow diagram of an example computer-implemented method 100 for measuring visual refractive error of a user. The steps shown in FIG. 1A may be performed by any suitable computer-executable code and/or computing system. In one example, each of the steps shown in FIG. 1A may represent an algorithm whose structure includes and/or is represented by multiple sub-steps, examples of which will be provided in greater detail below.

As illustrated in FIGS. 1A and 1B, at step 110 one or more of the systems described herein may display, to a user, an image including a first color in a first area and a second color in a second area. For example, a display system may display two different colors in different areas within a field-of-view of a user. The display system may display the two different colors in any suitable manner. For example, the display system may display the two different colors on a near-eye display screen. Alternatively, the display system may display the two different colors on a computer monitor, a TV screen, via projection onto a screen or wall, etc. Furthermore, in some embodiments, the first and second colors may be displayed via the same display device (e.g., screen, projector, etc.), and in other embodiments the first and second colors may be displayed via two different display devices.

FIG. 2 shows an exemplary display area 200 in which the two different colors may be displayed. A first color may be displayed within a first area 210 and a second color may be displayed within a second area 220. The first and second colors may be displayed as part of a pattern with one or more other colors (e.g., black, gray, brown, etc.) that may be selected in order to affect the size of a user's pupil (e.g., to enlarge the pupil). The patterns of the first and second colors may be the same or different, and the patterns may be made with any shape or design (e.g., lines, squares, etc.). Furthermore, in some embodiments (e.g., the example shown in FIG. 2) the first and second areas may be distinct such that the first and second colors do not overlap, but in other embodiments the first and second areas may partially overlap, still leaving areas in which the first and second colors are displayed independently.

The first and second colors may be chosen based on an expected longitudinal chromatic aberration of a human eye for the first and second colors. A longitudinal chromatic aberration may be the result of an optical system failing to focus colors within a given spectrum at the same convergence point. Longitudinal chromatic aberrations may occur when different wavelengths of light are focused at different distances from a lens (i.e., at different points along an optical axis). As discussed in connection with FIG. 5, numerous studies may have shown that longitudinal chromatic aberrations occur in the human eye, and these aberrations may be particularly perceivable between colors with wavelengths at the extreme ends of the visual spectrum (e.g., deep red and deep blue colors). Thus, the first and second colors may be chosen as red and blue. In other embodiments, any other two colors having a longitudinal chromatic aberration perceivable by a human may also be used.

According to various embodiments, more than two colors may be displayed. For example, as shown in display area 300 of FIG. 3, a third color may be displayed in a third area 230 between the first area 210 (i.e., the first color) and the second area 220 (i.e., the second color). As with the first color and the second color, the third color may be patterned in any suitable manner. Furthermore, the third color may have any wavelength between the wavelength of the first color in first area 210 and the wavelength of the second color in second area 220 such that the user's eye naturally focuses on the third area (the system may also direct the user to focus on the third area via visible or audible prompts). In such embodiments, the indication from the user may be based on the user's perception of the first and second areas while the user's eye is focused on the third area. In some embodiments, the first color may be blue, the second color may be red, and the third color may be green. Any other suitable combination of colors may also be used.

Figure 4:
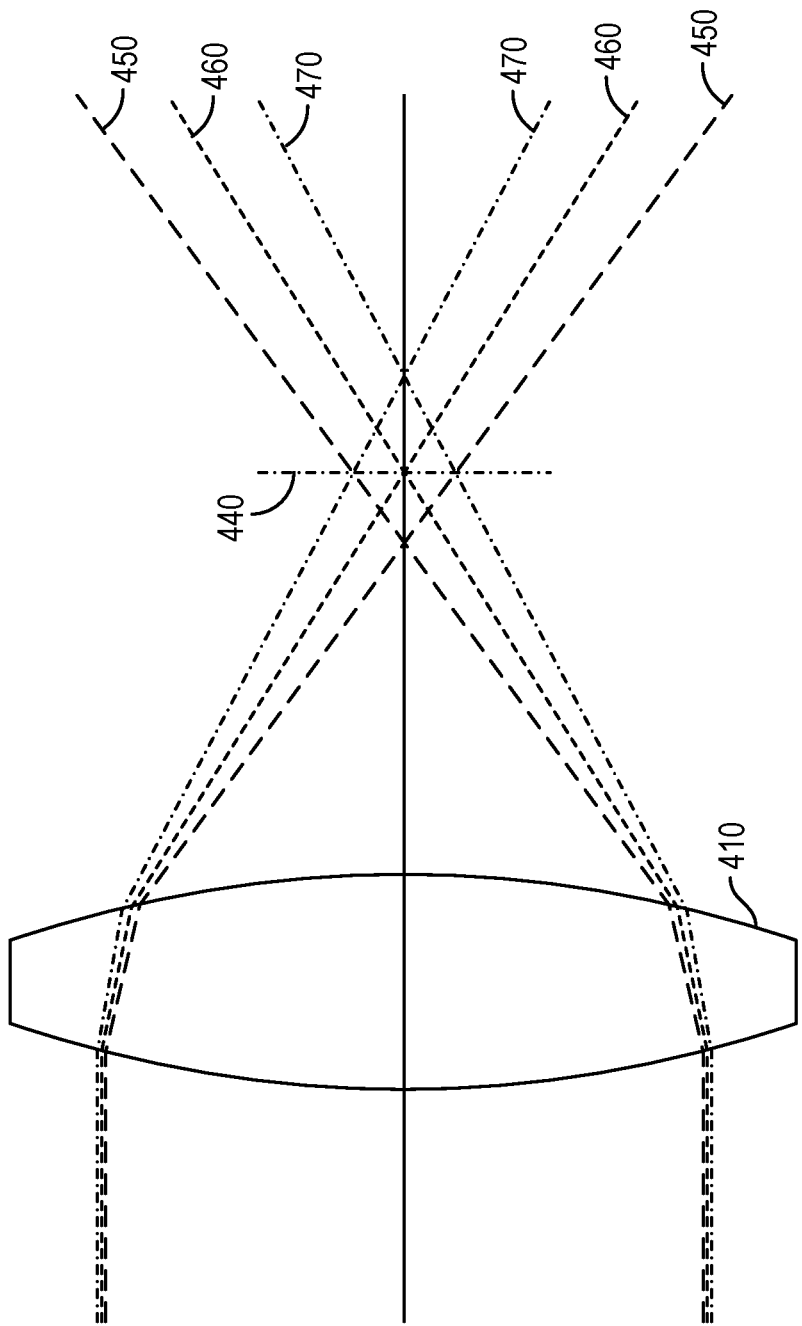
FIG. 4 illustrates expected longitudinal chromatic aberration of a human eye.

In some embodiments, the third color may be chosen as green because human eyes tend to be optimized to focus on green. As shown in FIG. 4, a lens 410 of a human eye may focus blue light rays 450 in front of a retina 440, red light rays 470 behind retina 440, and green light rays 460 on retina 440. This effect may be due to the longitudinal chromatic aberration of the human eye. Thus, if an image is presented that is beyond the eye's focal range, blue colors may be blurry and red colors may be less blurry or may not be blurry, and the converse may also hold (i.e., for near defocus, red colors may be blurrier than blue colors). Consequently, determining whether blue or red is blurrier to the user may be used to locate the user's focal range. This approach may be more useful than asking a user whether an image is clear or blurry, since (as noted above) when that approach is used, subjects tend to select the wrong amount of correction, which may result in eye fatigue.

Figure 5:
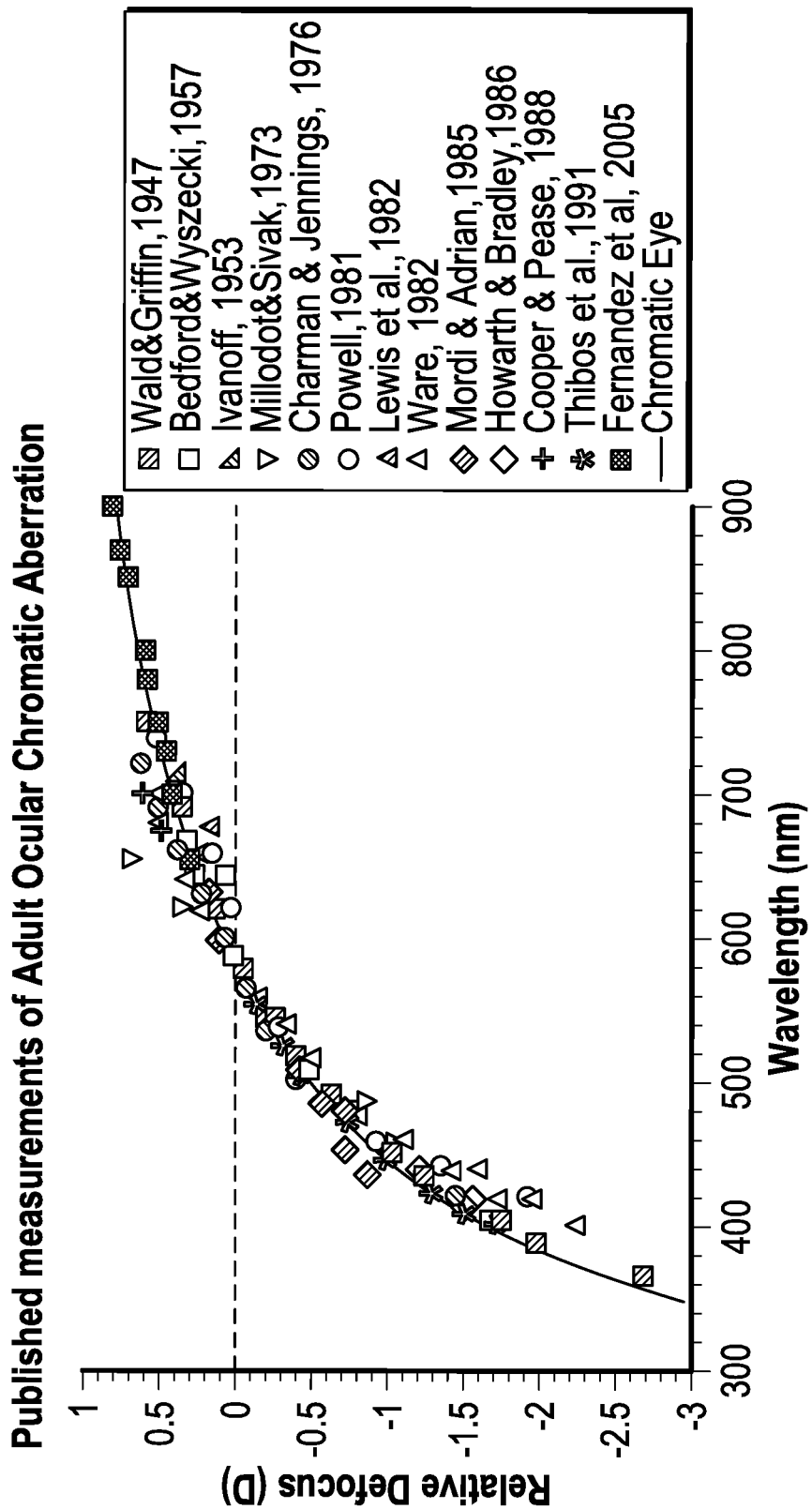
FIG. 5 shows published measurements of longitudinal chromatic aberrations of human eyes according to various embodiments.

Furthermore, various studies may have shown that longitudinal chromatic aberration is relatively consistent across the human population, as shown in FIG. 5. The chart in FIG. 5 also shows that absolute longitudinal chromatic aberration may differ slightly between different users, but embodiments of the instant disclosure may leverage relative longitudinal chromatic aberration of the human eye. In other words, regardless of a user's particular longitudinal chromatic aberration, the human eye may typically be expected to accommodate on green with red being focused behind the retina and blue being focused in front.

At step 120 in FIG. 1A, one or more of the systems described herein may receive, from the user, an indication of whether the user perceives the first area as being clearer than the second area or the second area as being clearer than the first area. The system may receive the indication in any suitable manner. For example, the system may receive the indication via a wired or wireless handheld controller, a voice detection system, a keyboard, a mouse, etc. In some embodiments the user may indicate that the first color is clearer and the second color is blurrier or that the second color is clearer and the first color is blurrier. In some embodiments, the user may indicate that both the first and second colors are clear or that both the first and second colors are blurry.

At step 130 in FIG. 1A, one or more of the systems described herein may determine, based on the indication of the user and the expected longitudinal chromatic aberration of the human eye, information about a refractive error of the user's vision. For example, as described in greater detail below, a processor of a vision system (e.g., a head-worn display) may determine that the displayed image is farther than a far point of accommodation of the user's vision or may determine that the displayed image is closer than a near point of accommodation of the user. In either case, the system may determine how to change a dioptric distance of the image to evaluate the refractive error of the user's vision.

The method depicted in FIG. 1B shares steps 110, 120, and 130 of the method depicted in FIG. 1A. However, in FIG. 1B, at step 125 the system may adjust the dioptric distance of the displayed image based on the indication received from the user in step 120. For example, in step 125 the system may change the dioptric distance of the image by increasing the dioptric distance of the image if the user indicates that the first area is clearer than the second area. Alternatively, in step 125 the system may decrease the dioptric distance of the image if the user indicates that the second area is clearer than the first area. The system may then return to step 110 and display the first and second colors at the adjusted dioptric distance. Steps 110-125 may be repeated until, for example, a proportion of times that the user sees the first area with more clarity reaches a predetermined value. This predetermined value may depend on the specific wavelengths of the first and second areas. The system may then proceed to step 130, in which the system may determine that the dioptric distance of the image provides an estimate of the refractive error of the user's eye.

The system may change a dioptric distance of the image in a variety of ways. For example, the system may change the dioptric distance by moving a lens or changing the optical power of a lens through which the user views the image. In some embodiments, the system may change a dioptric distance by changing a distance of the display itself. Additionally or alternatively, the lens may be an accommodative lens and the system may change the dioptric distance by adjusting an optical power of the accommodative lens. For example, an optical power of an accommodative lens may be changed by applying force directly or indirectly to a deformable element of the lens. An actuator may be mounted in-frame in a perimeter of an optical assembly such that it applies force directly to a perimeter volume of the deformable optical element. In some embodiments, accommodative lenses may be liquid lenses that are deformed by force distributors, such as electromechanical actuators. Various other adjustable lens configurations may also be used.

The steps of displaying colors to a user, receiving an indication of which color is clearer, and changing a dioptric distance of a displayed image may be repeated until the user's refractive error has been determined or estimated. Furthermore, in some embodiments, these steps may be repeated for each eye of a user to determine the refractive error of each eye of the user.

Figure 6:
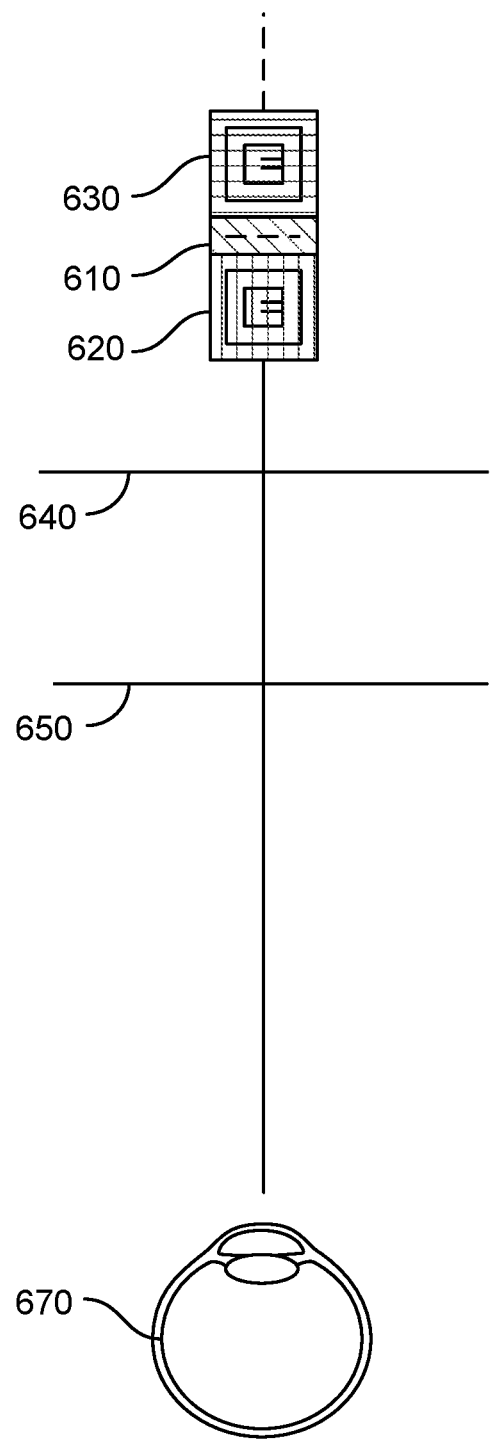
FIG. 6 is a representation of displaying a set of colors beyond a user's far point of accommodation.
Figure 7:
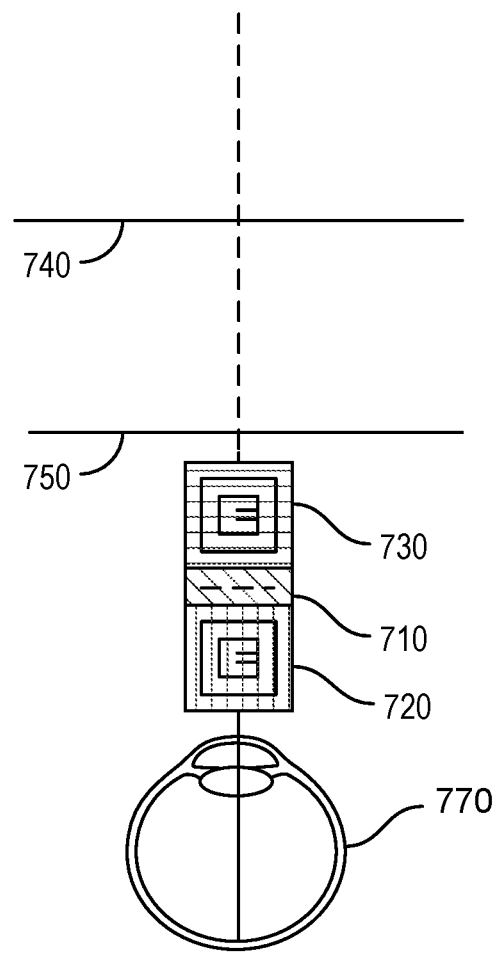
FIG. 7 is a representation of displaying a set of colors closer than a user's near point of accommodation.
Figure 8:
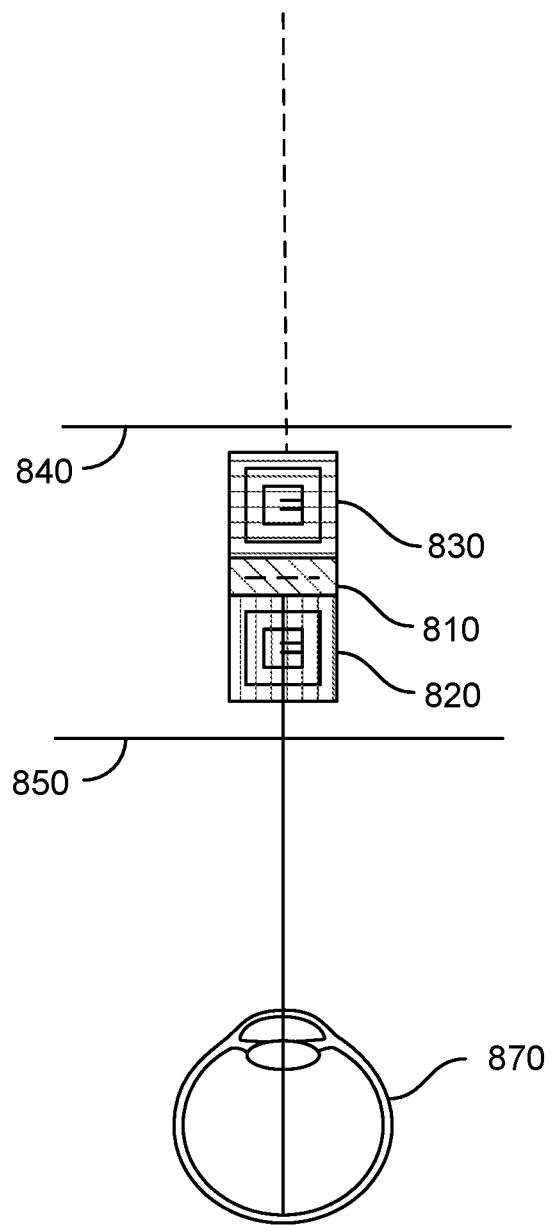
FIG. 8 is a representation of displaying the set of colors within a user's accommodation range.

FIGS. 6-8 illustrate longitudinal-chromatic-aberration based stimuli used in an embodiment and expected perceived blur patterns relative to a far point of accommodation for a user's eye and a near point of accommodation for the user's eye. In the example shown in FIG. 6, pattern 610 may be a green-and-black pattern, pattern 620 may be a red-and-black pattern, and pattern 630 may be a blue-and-black pattern. A user's eye may accommodate on green-and-black pattern 610 and, since patterns 630, 610, and 620 are at a dioptric distance beyond both the user's near point of accommodation 650 and the user's far point of accommodation 640, the user may perceive red-and-black pattern 620 to be sharper than a blue-and-black pattern 630. It may be the case that neither pattern is clear, but the goal is for the user to identify which pattern appears to be sharper (i.e., least unclear, or least blurry). Therefore, if a user indicates that red-and-black pattern 620 is clearer or that blue-and-black pattern 630 is blurrier, the system may determine that the dioptric distance of the display needs to be decreased.

Turning to FIG. 7, since patterns 710, 720, and 730 are at a dioptric distance closer than a far point of accommodation 740 and a near point of accommodation 750 for a user's eye 770, the user may perceive blue-and-black pattern 730 to be sharper than red-and-black pattern 720. Therefore, if a user indicates that blue-and-black pattern 730 is clearer or that red-and-black pattern 720 is blurrier, the system may determine that the dioptric distance of the display needs to be increased.

FIG. 8 depicts an image that is closer than a far point of accommodation 840 and farther than a near point of accommodation 850 (i.e., an image that is in focus within a user's accommodative range) for a user's eye 870. In this example, when the user's vision is focused on green-and-black pattern 810, the user would be expected to perceive red-and-black pattern 820 as having similar clarity to blue-and-black pattern 830. However, in practice, a user may sometimes perceive red-and-black pattern 820 as being clearer than blue-and-black pattern 830 when the images are between near and far points of accommodation 840 and 850. Users may sometimes also perceive blue-and-black pattern 830 as being clearer than red-and-black pattern 820 when the images are between near and far points of accommodation 840 and 850. Thus, some embodiments may involve various exemplary iterative processes to increase the accuracy of using the methods disclosed herein to estimate a refractive error of a user.

Figure 9:
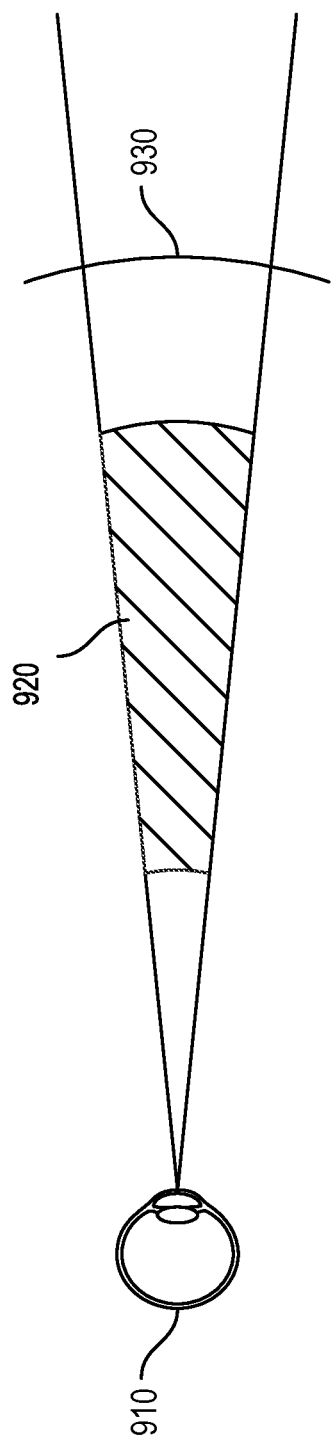
FIG. 9 is a representation of a near-sighted user.
Figure 10:
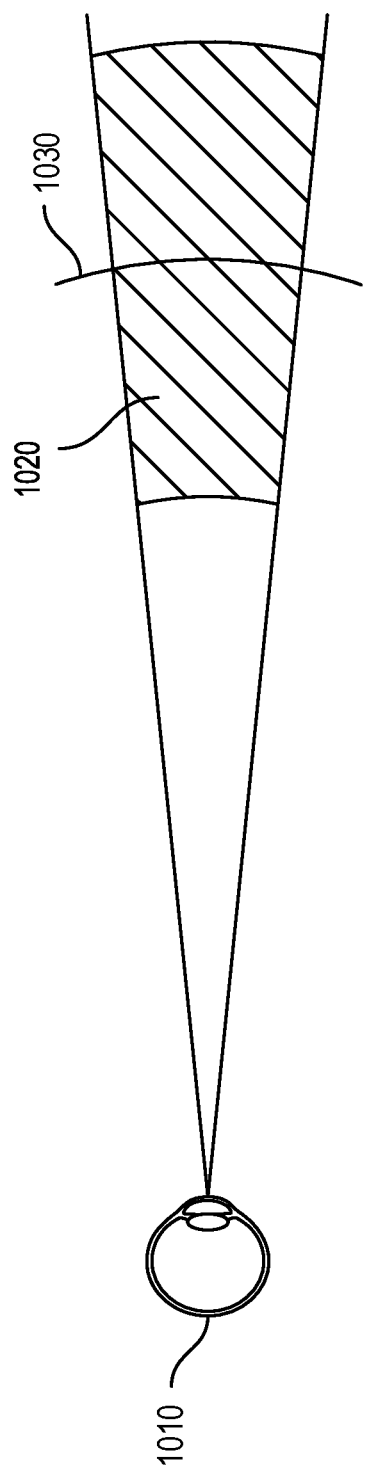
FIG. 10 is a representation of a far-sighted user.
Figure 11:
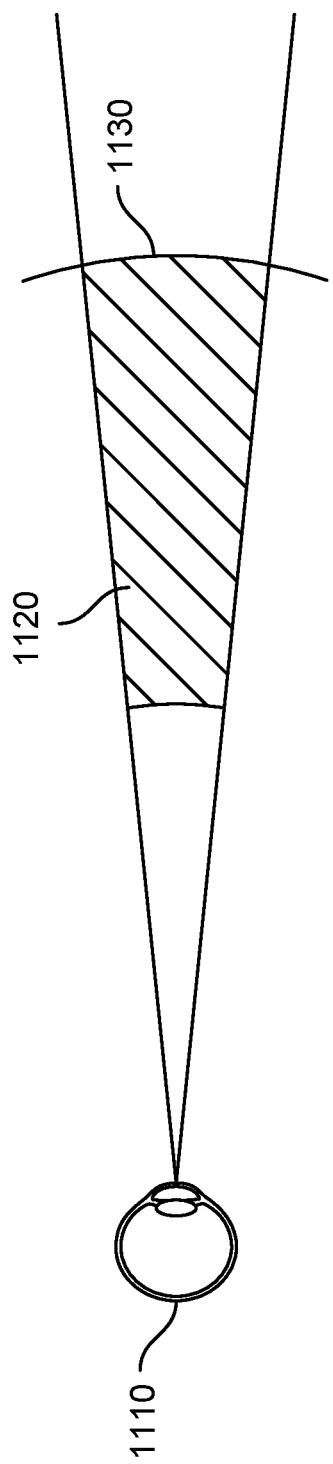
FIG. 11 is a representation of a user without significant refractive error.

FIGS. 9-11 depict zones of clear focus for myopes, hyperopes, and emmetropes relative to an optometrist's preferred far point (e.g., six meters). As shown in FIG. 9, an eye 910 of a myope may have a zone of clear focus 920 relative to far point 930. Similarly, FIG. 10 shows an eye 1010 of a hyperope may have a zone of clear focus 1020 relative to far point 1030, and FIG. 11 shows an eye 1110 of an emmetrope may have a zone of clear focus 1120 relative to a far point 1130. The zone of clear focus in each case represents the range of dioptric distances for which the user can achieve clear vision by accommodating or by relaxing their accommodation.

One example process for estimating the refractive error of a user may include first obtaining a rough estimate of a user's near and far points via a head-worn display. The process may be automated and controlled by computing system of the head-worn display and/or by any other suitable computing system. The process of estimating the near and far points may involve presenting a participant with an image (e.g., a scenic photograph) and changing the focus distance (e.g., in response to user input) until the image appears to be sharp. This procedure may be repeated, starting from the closest and farthest focus distances of the head-worn display to obtain the near and far points, respectively, of the user's accommodation or focal range. The far point estimate may provide a measure of a user's self-refraction, as well as being an efficient starting point for the more precise procedures that involve displaying patterns of different colors to a user.

For the more precise evaluation, embodiments of the instant disclosure may use a varifocal system with a dioptric range from 7.5D (near) to 3.5D (beyond optical infinity). This dioptric range may cover 95% of the population that need spherical correction only and 70% of the population that need spherical and cylindrical correction, but any other suitable optical range may also be used. In this example procedure, a focal distance of the system may be changed by moving display panels relative to display lenses, and each lens/panel module may be mounted on a separate lateral rail to allow for highly accurate inter-pupillary distance (IPD) adjustment to improve test results. In some embodiments, accurately identifying and adjusting for an IPD of a user may be useful because some head-worn display lenses may have significant field curvature that results in a reduction in image quality for off-axis viewing.

Some embodiments may use letter readability as a function of dioptric distance to assess visual acuity, which in turn provides a measure of image sharpness. For example, the 20/20 vision standard may be the ability to resolve one arcmin resolution (i.e., a 20/20 letter on a Snellen eye chart) or to see clearly at 20 feet what should normally be seen clearly at that distance. However, since some head-worn displays may have relatively low resolution (e.g., ~5 arcmin, equivalent to ~20/100), displaying patterns or other images may better facilitate measures of visual acuity to determine the range of clear vision and the far point when using such head-worn displays.

Returning to the procedure discussed above, after estimating a far point, a vision system may set a dioptric distance of blue, green, and red patterns beyond the estimated far point of accommodation and may query a user (e.g., via a visual or audio cue) about which color pattern is clearer. The display system may detect a response from the user and then change the dioptric distance based on the response of the user by a predetermined dioptric step size. In one example, the step size may be decreased proportionally to the number of responses a user has provided. In another example, a two or three down, one up method may be used. In this example, the display system may wait for two or three "red is sharper" responses in a row before reducing the dioptric distance, but the display system may respond to one "blue is sharper" response by increasing the dioptric distance. This approach may result a "staircase" (see FIG. 12) graph of dioptric distances over time. In some embodiments, the display system may wait for the staircase to converge around 60%-70% "red is sharper" responses. Once red is perceived to be sharper than blue approximately 60%-70% of the time, the display system may determine that image is within the user's accommodation (focal) range. In some embodiments, the display system may wait for the staircase to converge around 67% "red is sharper" responses before determining an estimate of a user's refractive error.

Figure 12:
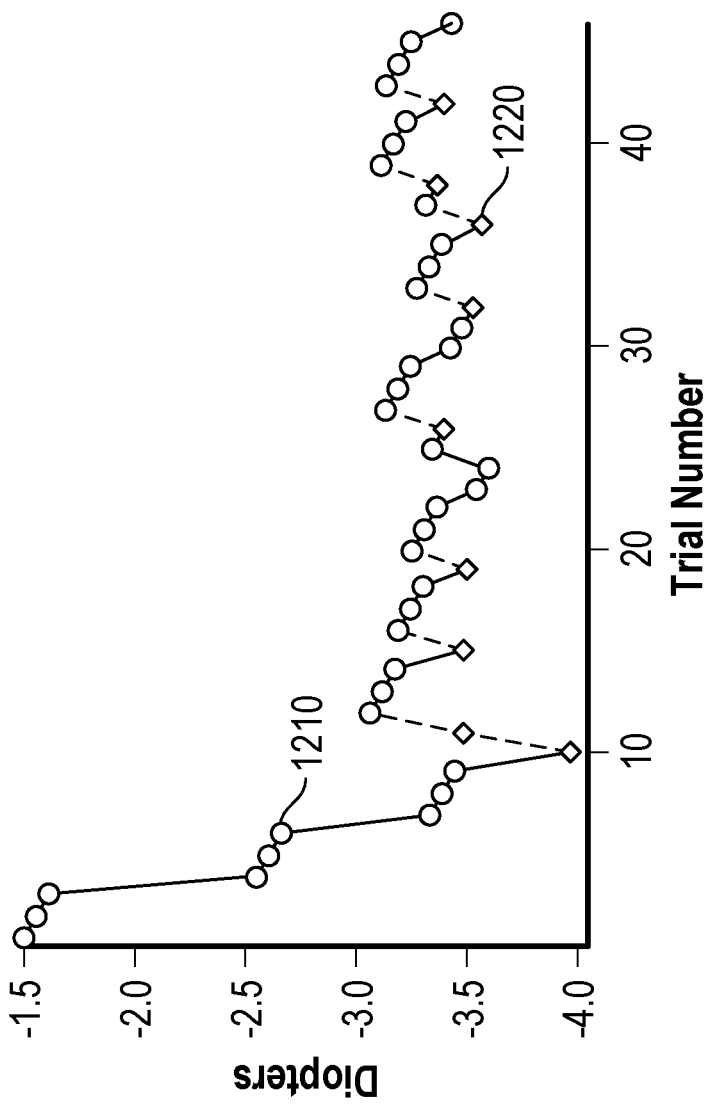
FIG. 12 is a chart showing exemplary test results of performing an exemplary embodiment.
Figure 13:
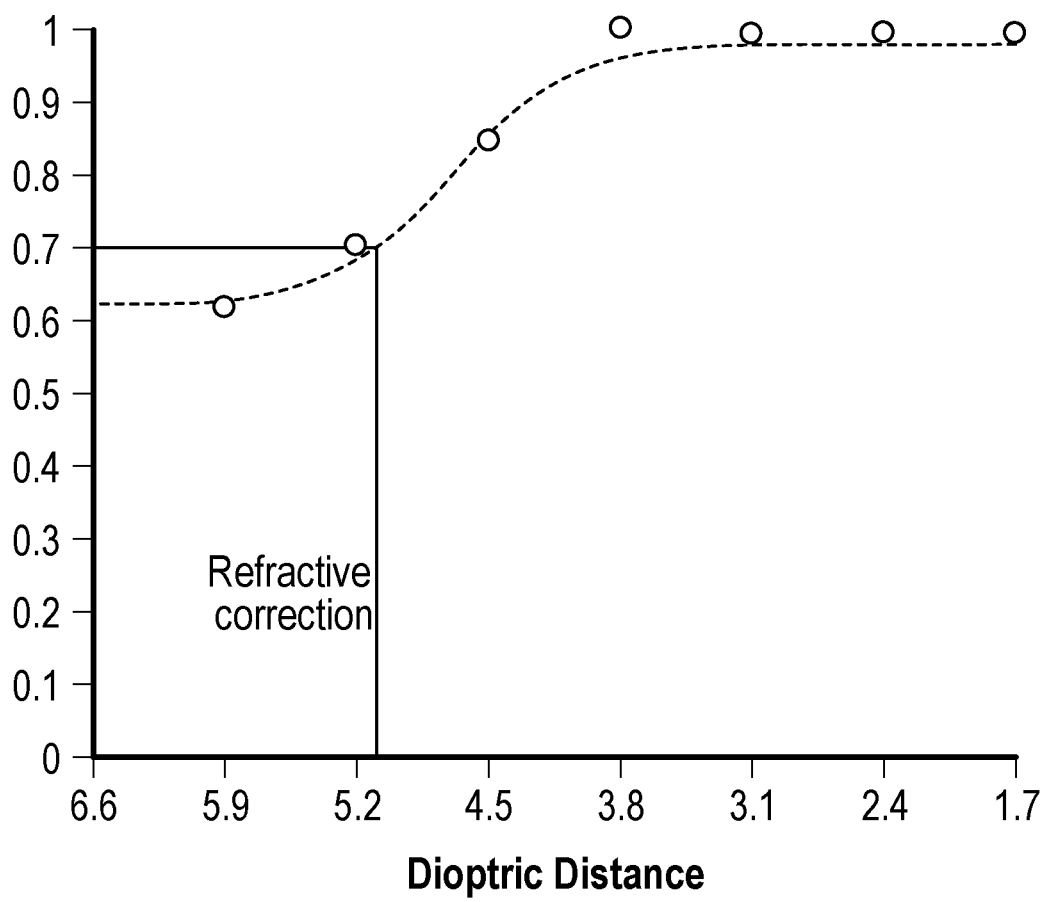
FIG. 13 is a chart of an exemplary psychometric fit.

FIG. 12 depicts exemplary test data from a participant using the "three down, one up" algorithm described above. Dots 1210 show trials in which the user perceived red as being sharper, and diamonds 1220 show trials in which the blue pattern was perceived as being sharper. In this test, for each participant, data was pooled across all four staircases for each eye, a fit was performed, and the dioptric distance was extracted for which the red pattern was perceived as sharper 70% of the time (approximately the point of inflection of the curve), in order to estimate the far point (see FIG. 13, which depicts data pooled across four "3 down 1 up" staircases run on the left eye for one pre-presbyopic participant).

Figure 14:
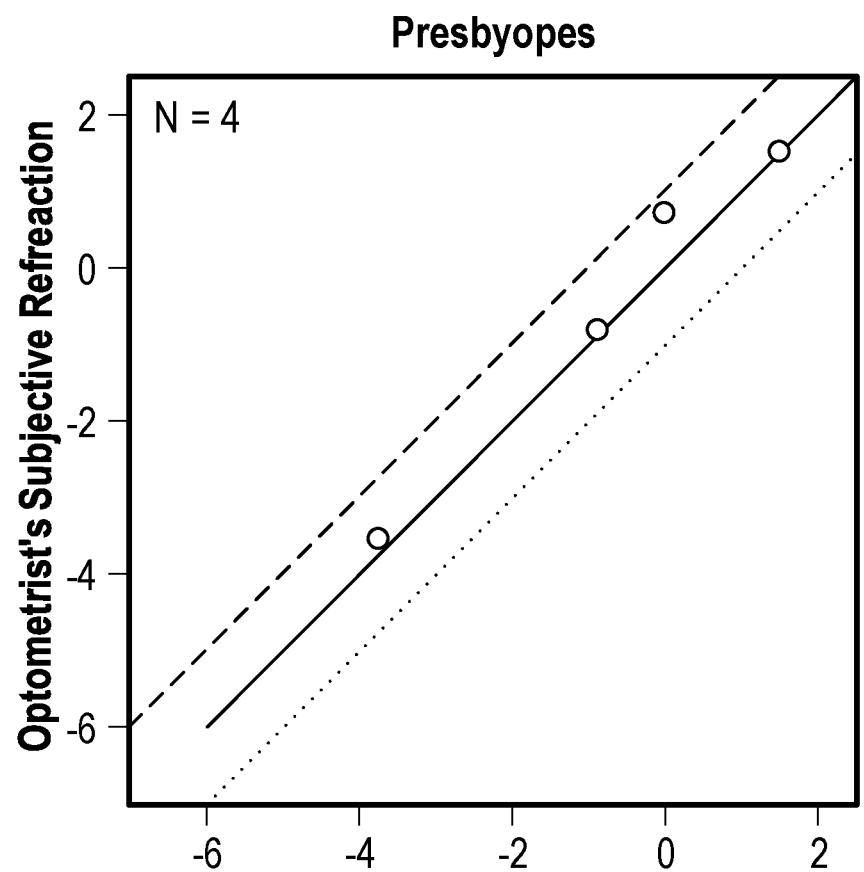
FIG. 14 shows exemplary refraction findings for presbyopes based on an exemplary test method.
Figure 15:
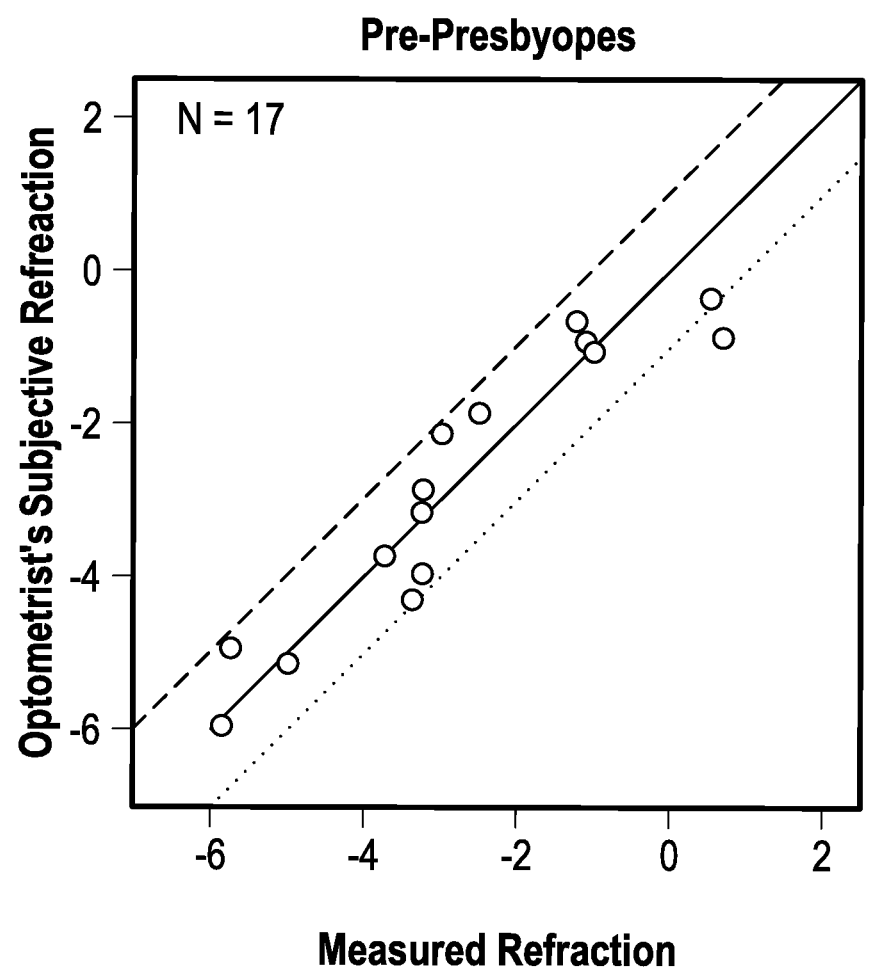
FIG. 15 shows exemplary refraction findings for pre-presbyopes based on an exemplary test method.

FIGS. 14 and 15 illustrate exemplary refraction (as measured by an embodiment of this disclosure) for the left eyes of test participants, as a function of each participant's prescription (as determined by an optometrist's subjective refraction measurement). The exemplary test methodology was able to reproduce the spherical equivalents (see below) of the prescriptions of each of the test participants within the 0.5D acceptability margin (represented by the dashed lines in FIGS. 14 and 15) that may be used in optometry practice.

The term "spherical equivalent," in some embodiments, refers to a spherical power whose focal point coincides with the circle of least confusion of a sphero-cylindrical lens. Hence, the spherical equivalent of a prescription may be equal to the algebraic sum of the value of the sphere and half the cylindrical value, i.e. sphere+cylinder/2. For example, the spherical equivalent of the prescription −3 D sphere −2 D cylinder axis 180° is equal to −4 D.

Calculating the spherical equivalent of a prescription may condense the part of the prescription for astigmatism, which has spherical, cylindrical components, into a single "spherical" number. A user's vision corrected via a spherical equivalent prescription may not be a clear as when the user's prescription encompasses both spherical and astigmatic terms individually; the larger the required cylindrical correction required potentially means that visual acuity and quality through spherical equivalent correct is poorer than with both. However, in general, use of a spherical equivalent prescription for a user with astigmatism may provide clearer vision than use of a spherical-only prescription. As explained herein, embodiments described herein may determine a user's spherical equivalent prescription.

Once a user's accommodation range (for each eye) has been identified, the corresponding distance of a display from a lens apparatus may be identified and may be set by a head-worn display so that the user is able to operate the head-worn display with built-in vision correction. The head-worn display and/or a corresponding memory may store that correction data for future use with, or recall by, the user.

In an embodiment, the display distance may be set by calculating the far point of the accommodation range and combining that distance with a distance that would correspond to a fixed focus distance for a fixed focus display system. For example, a 1.0 diopter myope would be corrected to 1.7 if the fixed focus correction is 0.7. For a varifocal system, a 4-diopter range, for example, this correction may be added to the overall range. Embodiments of the present disclosure may also provide any other suitable amount of correction.

A near-eye display embodiment may include a near-eye display system that displays to a user an image having a first area including a first color (e.g., blue) and a second area including a second color (e.g., red). In this embodiment, the second color may have a longer wavelength than the first color. The first and second colors may be selected based on an expected longitudinal chromatic aberration for a human eye. The near-eye display system may include an input device configured to receive an indication of whether the user perceives the first area or the second as being clearer (i.e., sharper, or less blurry) than the second area. The near-eye display system may also may include a processor programmed to determine, based on the indication of the user and the expected longitudinal chromatic aberration of the first and second colors, information about a refractive error of the user's vision (for example, the user's zone of clear focus, which would tell the system how to change a dioptric distance of the image to evaluate the refractive error of the user's vision).

A head-worn display system embodiment may include a processor that directs an actuator (for example, a varifocal actuation block, as discussed in greater detail below) to change the dioptric distance of the image by increasing the dioptric distance of the image if the user indicates that the first area is clearer than the second area, or by decreasing the dioptric distance of the image if the user indicates that the second area is clearer than the first area.

Figure 16:
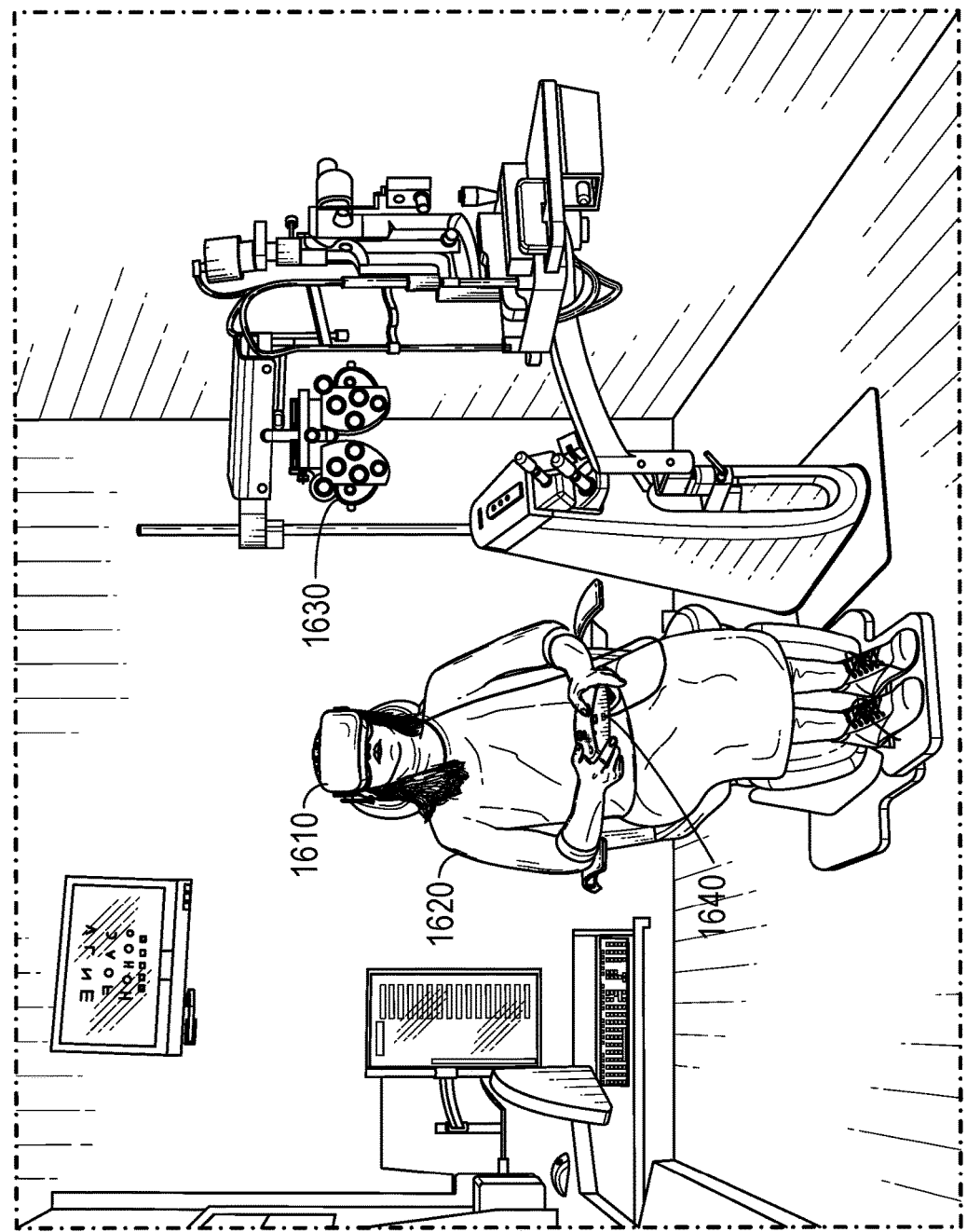
FIG. 16 shows a user self-evaluating her refractive error using systems and methods disclosed herein.

FIG. 16 depicts a user 1620 obtaining a refractive error estimate using an HMD 1610 of an embodiment. In the example depicted in FIG. 16, user 1620 is shown sitting in an examination chair and determining her own refractive error according to embodiments disclosed herein by using head-mounted display (HMD) 1610 in conjunction with an input device 1640. As discussed herein, user 1620 may obtain an estimate of her refractive error that would be expected to be similar to, within a margin of error, an estimate of her refractive error obtained through use of phoropter 1630.

Turning to FIGS. 17 and 18, FIG. 17 shows an exemplary HMD 1700 and FIG. 18 shows HMD 1700 as part of a varifocal system 1800. As shown in FIG. 17, HMD 1700 may include a front rigid body and a band that goes around a user's head. The front rigid body may include one or more electronic display elements, such as electronic display 1802 (shown in FIG. 18), inertial measurement unit (IMU) 1716, head tracking sensors 1718, and/or locators 1714. In one example, head tracking sensors 1718 may be located within IMU 1716. In some embodiments, where HMD 1700 is used in augmented-reality (AR) and/or mixed-reality (MR) applications, portions of HMD 1700 may be at least partially transparent, such that a user wearing HMD 1700 may see the external environment. For example, electronic display 1802 may be substantially transparent. Additionally or alternatively, one or more sides of the front rigid body may be substantially transparent.

In some examples, each of locators 1714 may emit light that is detectable by imaging device 1860 (shown in FIG. 18). In some examples, locators 1714 may be located in fixed positions on the front rigid body relative to one another and relative to a reference point. For example, locators 1714, or portions of locators 1714, may be located on a front side, a top side, a bottom side, a right side, and/or a left side of the front rigid body.

As noted, FIG. 18 shows an example varifocal system 1800 in which HMD 1700 may operate. In various examples, varifocal system 1800 may be for use as a VR system, an AR system, an MR system, or some combination thereof. As shown in FIG. 18, varifocal system 1800 may include HMD 1700, imaging device 1860, and I/O interface 1870, which may each be coupled to console 1850, which may provide rendered video or other data from engine 1856. While FIG. 18 shows a single HMD 1700, a single imaging device 1860, and a single I/O interface 1870, in other embodiments, any number of these components may be included in the system. For example, console 1850 may communicate with multiple HMDs, each with an associated I/O interface being monitored by an associated imaging device. In alternative configurations, different and/or additional components may also be included in the system environment.

HMD 1700 may present any of a variety of content to a user. Examples of content that may be presented by HMD 1700 include, without limitation, images, video, audio, and various combinations thereof. In some examples, a separate device (e.g., speakers and/or headphones) may present audio content received from HMD 1700 and/or console 1850. As shown in FIG. 18, HMD 1700 may include electronic display 1802, optics block 1804, varifocal actuation block 1806, focus prediction module 1808, eye tracking module 1810, vergence processing module 1812, one or more locators 1714, internal measurement unit (IMU) 1716, head tracking sensors 1718, and/or scene rendering module 1820.

Optics block 1804 may include any component and/or apparatus that directs light from electronic display 1802 (and, e.g., via an exit pupil) for viewing by a user. Optics block 1804 may include one or more optical elements, such as apertures, Fresnel lenses, convex lenses, concave lenses, filters, and so forth, and may include combinations of different optical elements (e.g., which may operate in tandem to modify optical properties of one or more images presented to the user). In some embodiments, one or more optical elements in optics block 1804 may have one or more treatments and/or coatings, such as anti-reflective coatings. In some examples, magnification of the image light by optics block 1804 may allow for a smaller electronic display 1802 (e.g., that is physically smaller, weighs less, and/or consumes less power than displays that operate without the benefit of optics block 1804). Additionally, magnification of the image light may increase a field of view of the content displayed by HMD 1700. For example, the field of view of the displayed content may be such that the displayed content is presented using all or almost all (e.g., 150 degrees diagonal) of the user's field of view.

Optics block 1804 may be adapted to correct one or more optical errors. Examples of optical errors include, without limitation, barrel distortion, pincushion distortion, longitudinal chromatic aberration, transverse chromatic aberration, spherical aberration, chromatic aberration, field curvature, and astigmatism. In some embodiments, content provided to electronic display 1802 for display may be pre-distorted, and optics block 1804 may correct the distortion when it receives image light from electronic display 1802 generated based on the content.

Varifocal actuation block 1806 may cause optics block 1804 to vary the focal distance of HMD 1700. For example, varifocal actuation block 1806 may adjust the optical power of a varifocal lens within optical block 1804. In one embodiment, varifocal actuation block 1806 may physically change the distance between electronic display 1802 and optical block 1804 (e.g., by moving electronic display 1802 and/or optical block 1804). For example, varifocal actuation block 1806 may include one or more actuators or motors that move electronic display 1802 and/or optical block 1804 to change the distance between them. In some examples, varifocal actuation block 1806 may move and/or translate two lenses (e.g., within optical block 1804) relative to each other to change the focal distance of HMD 1700. While shown as distinct elements in FIG. 2, in some examples varifocal actuation block 1806 may be integrated into optics block 1804.

Optics block 1804 may be configured with a variety of states. In some examples, each state of optics block 1804 may correspond to a focal distance of HMD 1700 or to a combination of the focal distance and the user's eye position relative to optics block 1804. As an example of possible state configurations, optics block 1804 may move within a range of approximately 5-10 mm with a positional accuracy of approximately 5-10 µm, resulting in approximately 1000 distinct focal distances for optics block 1804. While optics block 1804 may be adapted to provide for any number of states, a relatively limited number of states may be sufficient to accommodate the sensitivity of the human eye. Accordingly, in some embodiments, optics block 1804 may provide for fewer distinct focal distances. For example, a first state may correspond to a theoretically infinite focal distance (0 diopter), a second state may correspond to a focal distance of approximately 2.0 meters (0.5 diopter), a third state may correspond to a focal distance of approximately 1.0 meters (1 diopter), a fourth state may correspond to a focal distance of approximately 0.5 meters (2 diopters), a fifth state may correspond to a focal distance of approximately 0.330 meters (3 diopters), and a sixth state may correspond to a focal distance of approximately 0.250 meters (4 diopters). Varifocal actuation block 1806 may thus set and change the state of optics block 1804 to achieve a desired focal distance.

Focus prediction module 1808 may represent an encoder including logic that tracks the position or state of optics block 1804 to predict one or more future states or locations of optics block 1804. For example, focus prediction module 1808 may accumulate historical information corresponding to previous states of optics block 1804 and may predict a future state of optics block 1804 based on the previous states. Because HMD 1700 may adjust the rendering of a virtual scene based on the state of optics block 1804, the predicted state may allow scene rendering module 1820 to determine an adjustment to apply to the virtual scene for a particular frame. Accordingly, focus prediction module 1808 may communicate information describing a predicted state of optics block 1804 for a frame to scene rendering module 1820.

Eye tracking module 1810 may track eye position and/or eye movement of a user of HMD 1700. A camera or other optical sensor inside HMD 1700 may capture image information of a user's eyes, and eye tracking module 1810 uses the captured information to determine interpupillary distance, interocular distance, a three-dimensional (3D) position of each eye relative to HMD 1700 (e.g., for distortion adjustment purposes), a magnitude of torsion and rotation (i.e., roll, pitch, and yaw) for each eye, and/or gaze directions for each eye. In one example, infrared light may be emitted within HMD 1700 and reflected from each eye. The reflected light may be received or detected by the camera and analyzed to extract eye rotation data from changes in the infrared light reflected by each eye. Eye tracking module 1810 may use any of a variety of methods to track the eyes of a user. In some examples, eye tracking module 1810 may track up to six degrees of freedom of each eye (i.e., 3D position, roll, pitch, and yaw) and may combine at least a subset of the tracked quantities from two eyes of a user to estimate a gaze point of the user (i.e., a 3D location or position in the virtual scene where the user is looking). For example, eye tracking module 1810 may integrate information from past measurements, measurements identifying a position of a user's head, and 3D information describing a scene presented by electronic display element 1802. Thus, eye tracking module 1810 may use information for the position and orientation of the user's eyes to determine the gaze point in a virtual scene presented by HMD 1700 where the user is looking.

Further, in some examples eye tracking module 1810 may correct for image distortions introduced when the user's eyes move. For example, the distance between a pupil and optics block 1804 changes as the eye moves to look in different directions. The varying distance between pupil and optics block 1804 as viewing direction changes may cause a distortion referred to as "pupil swim" and contributes to distortion perceived by the user as a result of light focusing in different locations as the distance between the pupil and optics block 1804 changes. Accordingly, measuring distortion at different eye positions and pupil distances relative to optics block 104 and generating distortion corrections for different positions and distances allows mitigation of distortion caused by "pupil swim" by tracking the 3D position of a user's eyes and applying a distortion correction corresponding to the 3D position of each of the user's eye at a given point in time. Thus, knowing the 3D position of each of a user's eyes allows for the mitigation of distortion caused by changes in the distance between the pupil of the eye and optics block 104 by applying a distortion correction for each 3D eye position.

Vergence processing module 1812 may determine a vergence depth of a user's gaze based on the gaze point or an estimated intersection of the gaze lines determined by eye tracking module 1810. In some examples, "vergence" may refer to the simultaneous movement or rotation of both eyes in opposite directions to maintain single binocular vision, which is naturally and automatically performed by the human eye. Thus, a user's eyes may verge to a point where the user is looking. The user's eyes may also individually focus on the vergence point. Vergence processing module 1812 may determine the vergence depth in any suitable manner. For example, vergence processing module 1812 may triangulate the gaze lines (e.g., determined by an eye tracking module) to estimate a distance or depth from the user associated with intersection of the gaze lines. In some examples, HMD 1700 may then use the depth associated with intersection of the gaze lines as an approximation for the accommodation distance, which identifies a distance from the user where the user's eyes are directed. Thus, the vergence distance allows determination of a location where the user's eyes should be focused and a depth from the user's eyes at which the eyes are focused, thereby providing information (such as an object or plane of focus) for rendering adjustments to the virtual scene.

Figure 19:
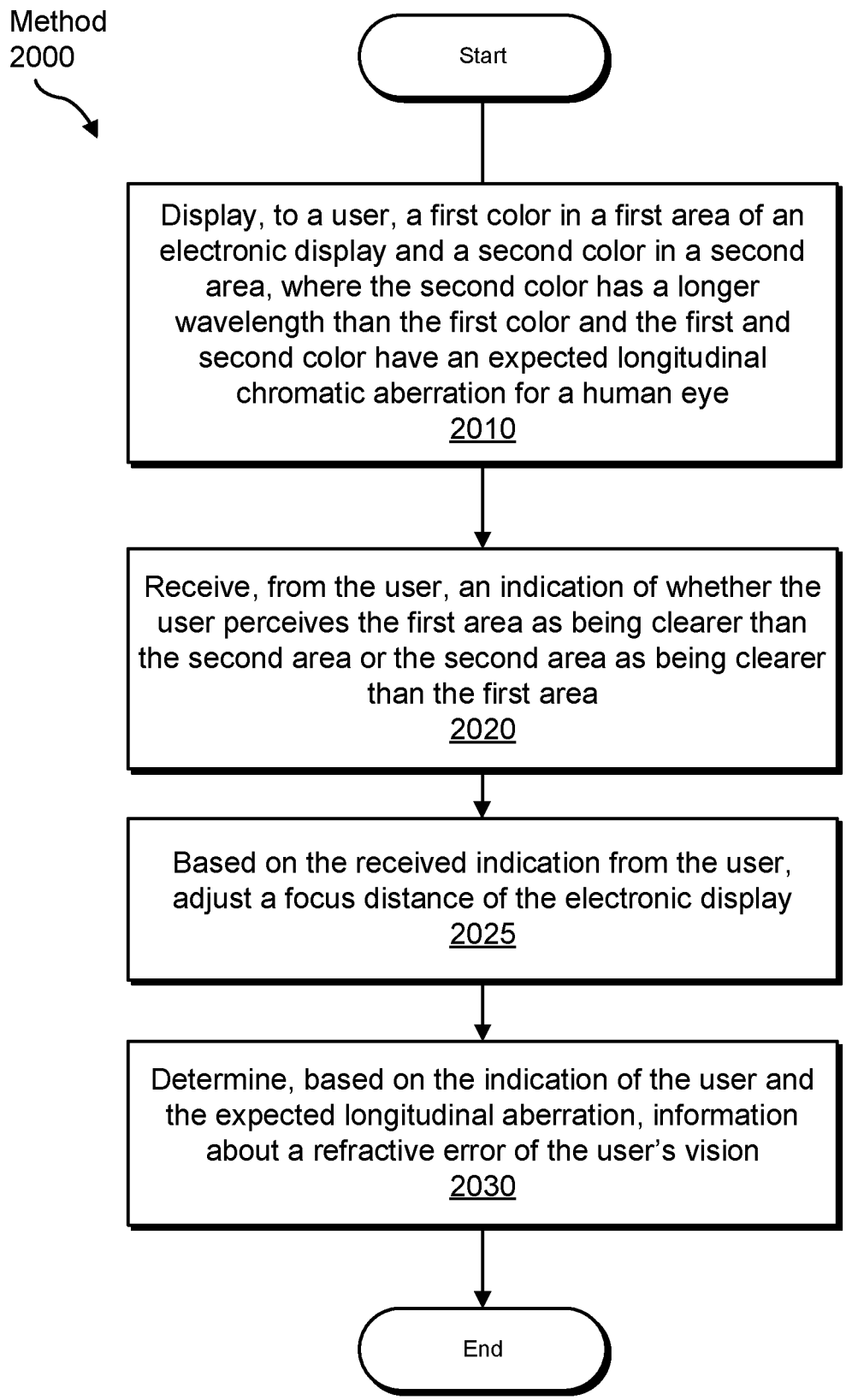
FIG. 19 is a flow diagram of an exemplary method for measuring a user's refractive error.

FIG. 19 is a flow diagram of an exemplary method for measuring a user's refractive error. In step 2010, one or more of the systems described herein may display, to a user, a first color in a first area of an electronic display and a second color in a second area, where the second color has a longer wavelength than the first color and the first and second color have an expected longitudinal chromatic aberration for a human eye.

In step 2020, one or more of the systems described herein may receive, from the user, an indication of whether the user perceives the first area as being clearer than the second area or the second area as being clearer than the first area. In step 2025, one or more of the systems described herein may, based on the received indication from the user, adjust a focus distance of the electronic display.

In step 2030, one or more of the systems described herein may determine, based on the indication of the user and the expected longitudinal aberration, information about a refractive error of the user's vision.

As noted above, embodiments described herein may include devices and methods superior to those that simply allow a user to adjust a display until it becomes clear. When that "user-decides" approach is used, subjects tend to select the wrong amount of correction, which may cause eye fatigue.

The embodiments described herein are provided for illustration, and are not intended to limit claim scope. Moreover, those skilled in the art will recognize that various modifications may be made to the details and embodiments described herein without departing from the scope of the appended claims. For example, instead of changing focal distance by moving a display, focal distance may be changed by varying the focus of a varifocal lens. Different colors, and different forms of stimuli also may be used, and a different form of data analysis may be used to determine whether refractive error is being accurately estimated.

Embodiments described herein include a method and apparatus that may determine a user's spherical refractive error (discussed below) and, in some embodiments, minimize defocus caused by that error. While certain embodiments are described herein with respect to an HMD-based implementation, other embodiments may be used in different, non-HMD, contexts. One or more embodiments may also include a method and apparatus that at least partially accounts for a user's cylindrical refractive error by using a spherical equivalent. Furthermore, all the above system features may be implemented or controlled by software or firmware stored in a non-transitory computer readable medium.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
selecting a wavelength of a first color for a first area of an image and a wavelength of a second color for a second area of the image based on measurements of ocular longitudinal chromatic aberrations associated with the wavelength of the first color and the wavelength of the second color, the wavelength of the second color being longer than the wavelength of the first color;
selecting a wavelength of a third color for a third area of the image located between the first area and the second area, the wavelength of the third color being between the wavelength of the first color and the wavelength of the second color;
selecting a dioptric distance for displaying the image for viewing by a user based on one of the wavelength of the first color or the wavelength of the second color;
displaying, to the user, the image at the dioptric distance;
receiving, from the user, one of an indication that the user perceives the first area as being clearer than the second area, or that the user perceives the second area as being clearer than the first area while at least one eye of the user is focused on the third area of the image; and
determining, based on the indication of the user and the measurements of the ocular longitudinal chromatic aberrations associated with the wavelength of the first color and the wavelength of the second color, information about a refractive error of a vision of the user.

2. The computer-implemented method of claim 1, wherein:
the first color comprises a blue color;
the second color comprises a red color; and
the third color comprises a green color.

3. The computer-implemented method of claim 1, wherein determining the information about the refractive error of the vision of the user further comprises determining how to change the dioptric distance of the image to evaluate the refractive error of the vision of the user.

4. The computer-implemented method of claim 3, further comprising changing the dioptric distance of the image by:
increasing the dioptric distance of the image if the user indicates that the first area is clearer than the second area; or
decreasing the dioptric distance of the image if the user indicates that the second area is clearer than the first area.

5. The computer-implemented method of claim 4, further comprising repeating the receiving, determining, and changing steps to obtain an estimate of the refractive error of the vision of the user.

6. The computer-implemented method of claim 4, wherein changing the dioptric distance comprises changing a distance between the image and a lens through which the user views the image by moving at least one of:
the lens; or
a display on which the image is shown.

7. The computer-implemented method of claim 4, wherein changing the dioptric distance comprises changing an optical power of a lens through which the user views the image.

8. The computer-implemented method of claim 1, wherein the displaying, receiving, and determining steps are performed for each eye of the user.

9. The computer-implemented method of claim 1, wherein:
the indication from the user indicates that the user perceives the first area and the second area as having similar clarity; and
determining the information about the refractive error of the vision of the user comprises determining that the dioptric distance of the image comprises an estimate of the refractive error of the vision of the user.

10. The computer-implemented method of claim 1, where the image is shown to the user via a near-eye display.

11. The computer-implemented method of claim 10, wherein the near-eye display comprises a display of a head-worn artificial reality system.

12. A system comprising:
a near-eye display configured to display, to a user, an image at a dioptric distance for viewing by the user, the image comprising:
a first color of a first wavelength in a first area,
a second color of a second wavelength in a second area, and
a third color of a third wavelength in a third area located between the first area and the second area, wherein:
at least one first measurement of ocular longitudinal chromatic aberrations is associated with the first wavelength;
at least one second measurement of ocular longitudinal chromatic aberrations is associated with the second wavelength;
the second wavelength is longer than the first wavelength;
the third wavelength is between the first wavelength and the second wavelength; and
selecting the dioptric distance is based on one of the first wavelength or the second wavelength;
an input device configured to receive, from the user, one of an indication that the user perceives the first area as being clearer than the second area, or that the user perceives the second area as being clearer than the first area while at least one eye of the user is focused on the third area of the image; and
a processor programmed to determine, based on the indication of the user, the at least one first measurement, and the at least one second measurement, information about a refractive error of a vision of the user.

13. The system of claim 12, wherein:
the first color comprises a blue color;
the second color comprises a red color; and
the third color comprises a green color.

14. The system of claim 12, wherein the processor determines the information about the refractive error of the vision of the user by determining how to change the dioptric distance of the image to evaluate the refractive error of the vision of the user.

15. The system of claim 14, wherein the processor directs an actuator to change the dioptric distance of the image by:
increasing the dioptric distance of the image if the user indicates that the first area is clearer than the second area; or
decreasing the dioptric distance of the image if the user indicates that the second area is clearer than the first area.

16. The system of claim 15, wherein the actuator changes the dioptric distance by moving at least one of:
a lens through which the user views the image; and
a display on which the image is shown.

17. The system of claim 15, wherein the actuator changes the dioptric distance by changing an optical power of an accommodative lens.

18. The system of claim 12, wherein the steps of the displaying of the image at the dioptric distance for viewing by the user by the near-eye display, the receiving of the one of an indication that the user perceives the first area as being clearer than the second area, or that the user perceives the second area as being clearer than the first area by the input device, and the determining of the information about the refractive error of the vision of the user by the processor are performed for each eye of the user.

19. The system of claim 12, wherein:
the indication from the user indicates that the user perceives the first area and the second area as having similar clarity; and
determining the information about the refractive error of the vision of the user comprises determining that the dioptric distance of the image comprises an estimate of the refractive error of the vision of the user.

20. A non-transitory computer-readable medium comprising one or more computer-executable instructions that, when executed by at least one processor of a computing system, cause the computing system to:
select a wavelength of a first color for a first area of an image and a wavelength of a second color for a second area of the image based on measurements of ocular longitudinal chromatic aberrations associated with the wavelength of the first color and the wavelength of the second color, the wavelength of the second color being longer than the wavelength of the first color;
select a wavelength of a third color for a third area of the image located between the first area and the second area, the wavelength of the third color being between the wavelength of the first color and the wavelength of the second color;
select a dioptric distance for displaying the image for viewing by a user based on one of the wavelength of the first color or the wavelength of the second color;
display, to the user, the image at the dioptric distance;
receive, from the user, one of an indication that the user perceives the first area as being clearer than the second area, or that the user perceives the second area as being clearer than the first area while at least one eye of the user focused on the third area of the image; and
determine, based on the indication of the user and the measurements of the ocular longitudinal chromatic aberrations associated with the wavelength of the first color and the wavelength of the second color, information about a refractive error of a vision of the user.

* * * * *